R. P. PERRY & E. F. STEWART.
PROCESS AND APPARATUS FOR PREPARING HARD COMMERCIAL PITCH.
APPLICATION FILED FEB. 16, 1916.
1,210,097.
Patented Dec. 26, 1916.
5 SHEETS—SHEET 4.
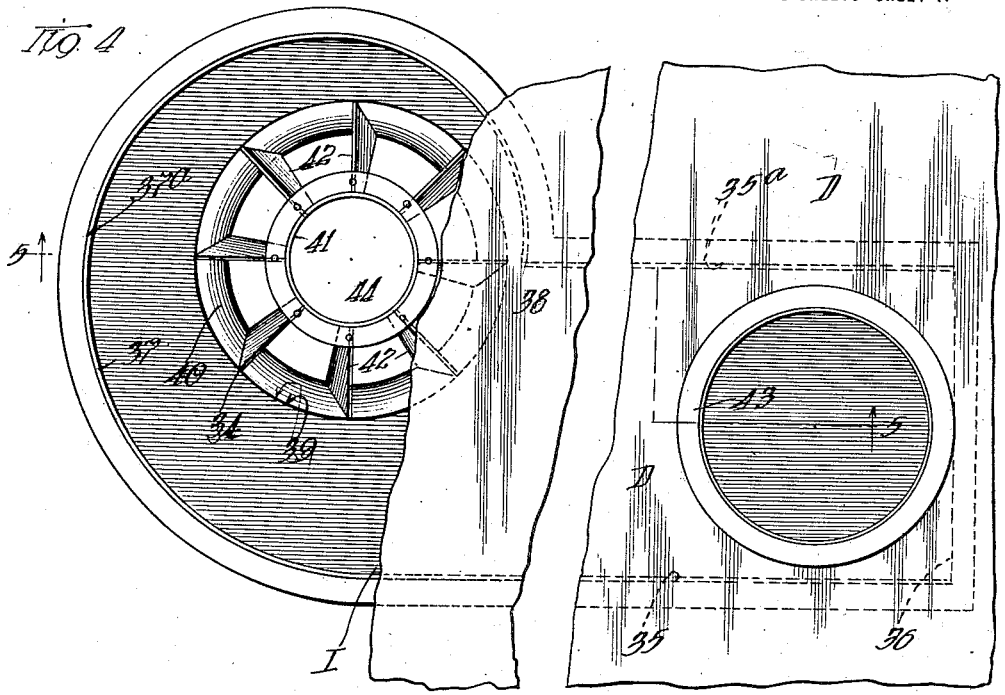
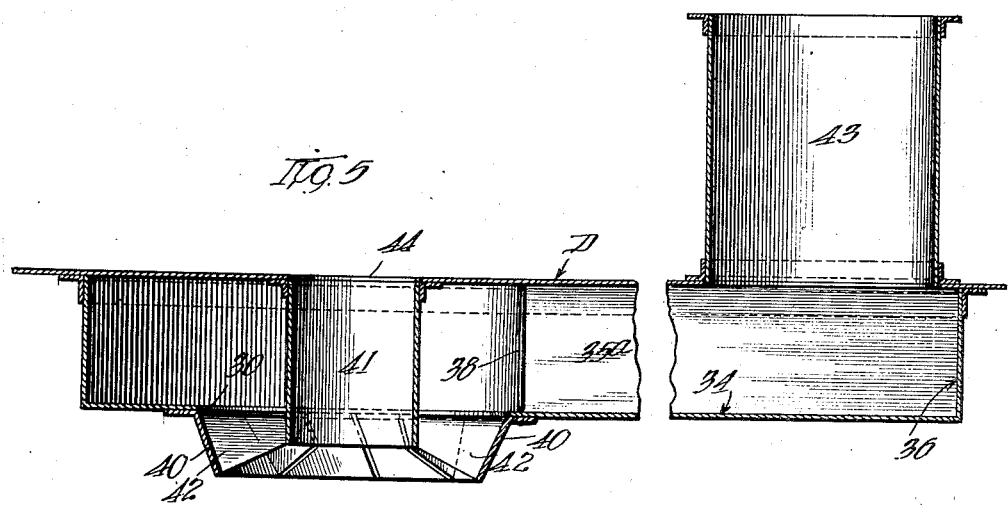
Witness:
R. Bauerle
Inventors:
Ray P. Perry and Edwin
F. Stewart
By Michael J. Stark & Sons
Attys.

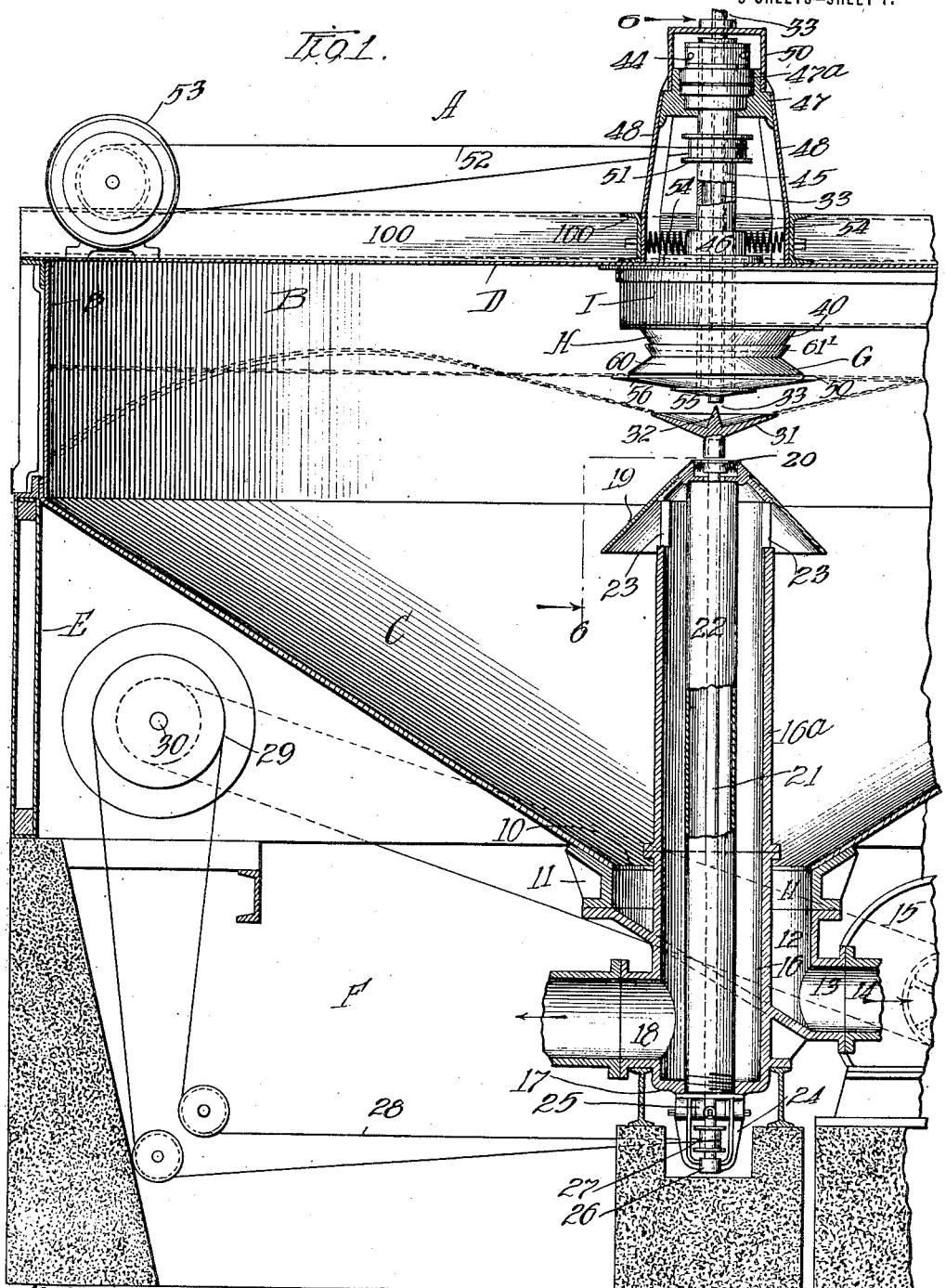

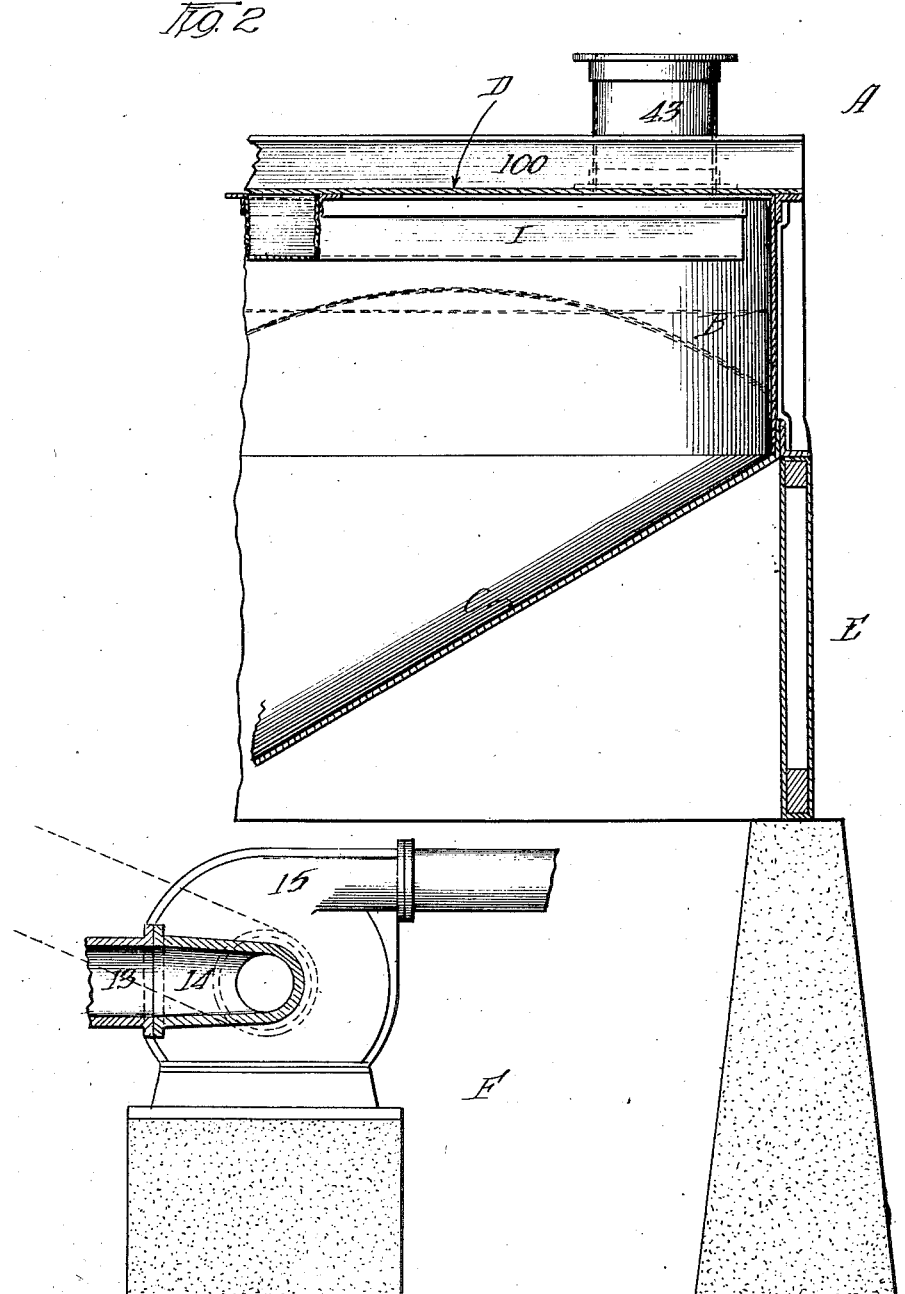

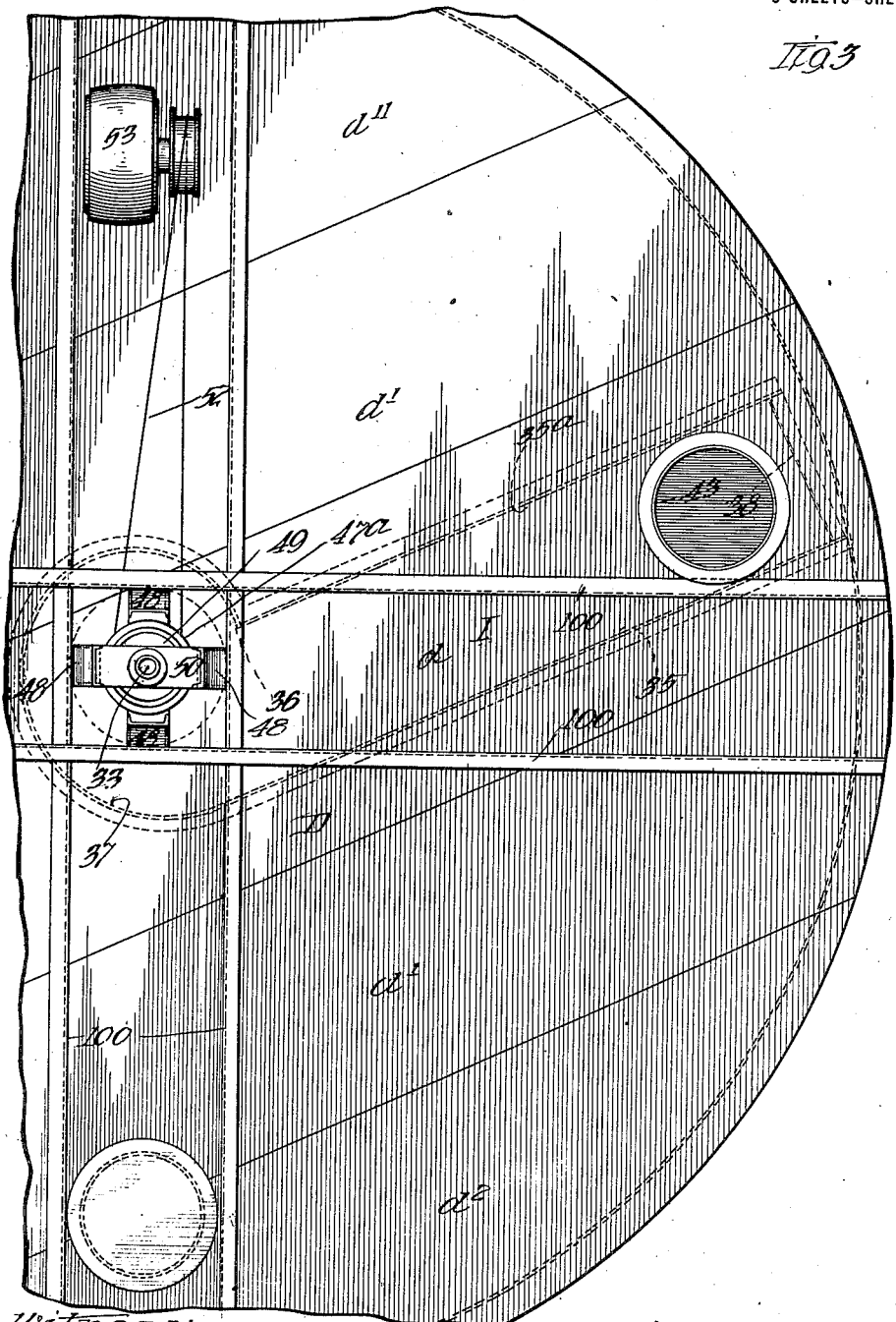

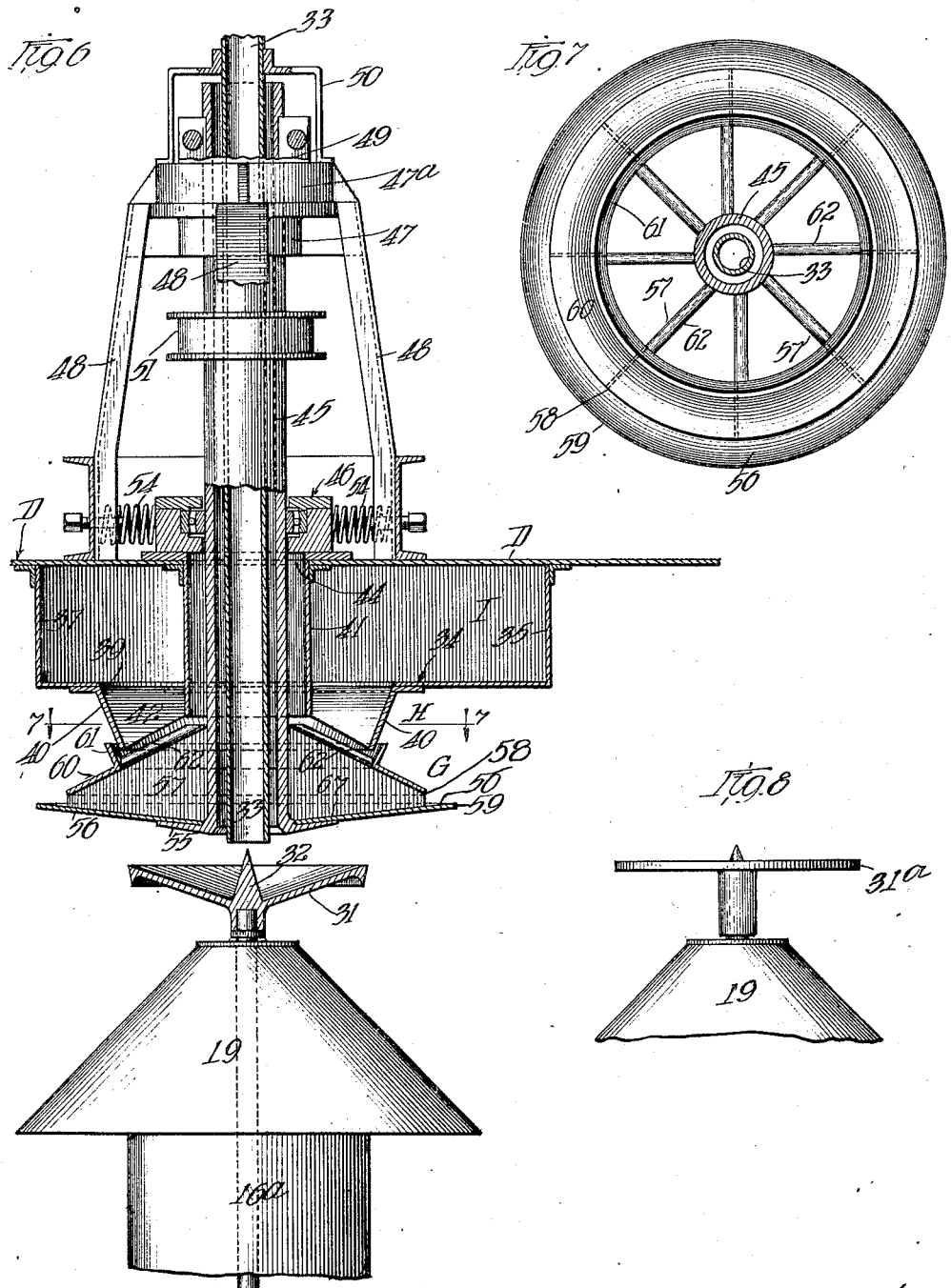

UNITED STATES PATENT OFFICE.

RAY P. PERRY, OF MONTCLAIR, AND EDWIN F. STEWART, OF WOODCLIFFE, NEW JERSEY, ASSIGNORS TO BARRETT MANUFACTURING COMPANY, OF NEW YORK, N. Y., A CORPORATION OF WEST VIRGINIA.

PROCESS AND APPARATUS FOR PREPARING HARD COMMERCIAL PITCH.

1,210,097.   Specification of Letters Patent.   Patented Dec. 26, 1916.

Application filed February 16, 1916. Serial No. 78,643.

*To all whom it may concern:*

Be it known that we, RAY P. PERRY and EDWIN F. STEWART, citizens of the United States, and residents of Montclair and Woodcliffe, New Jersey, respectively, have invented a certain new and useful Improvement in the Process and Apparatus for Preparing Hard Commercial Pitch; and we do hereby declare that the following description of our said invention, taken in connection with the accompanying drawings, forms a full, clear, and exact specification, which will enable others skilled in the art to which it appertains to make and use the same.

Our invention relates generally to improvements in processes and apparatus for the preparation of hard commercial pitch in the form of small particles, and it consists, essentially, in the novel and peculiar arrangement of parts and in the details of construction, as hereinafter first fully set forth and described, and then pointed out in the claims.

One particular application of our invention relates to the preparation of hard, commercial pitch in the shape of small, hard, particles, similar to the product disclosed and claimed in the patent to Chester N. Stevens, No. 1,088,635, of Feb. 24, 1914. The process and apparatus employed by us, however, in the preparation of the said product, is widely different from that made use of by Stevens. Briefly, said process and apparatus employed by us, consists in subjecting a stream of molten pitch to centrifugal action, thereby causing the fluid to separate into small particles, and, while thus subjecting the fluid pitch to such action, causing the projection of the same through a parabolic path, and causing the passage thereof through a curtain of water, whereby the vapors arising from said molten pitch are wholly or partially condensed and an initial cooling of the pitch particles caused to take place.

The process is effected in a preferably cylindrical, closed vessel, into which, and axially thereof, is introduced, through a suitable pipe, the molten pitch which is to be subjected to centrifugal action through a radially parabolic path. Likewise introduced into the vessel, and about its axis, is a constant stream of water of sufficient volume and velocity, which water is also subjected to centrifugal action, but in a plane, so that the pitch is projected through this resultant water curtain, as it were; and, by reason of its initial velocity, is caused to impact against the circumscribing side wall of the vessel and then to drop to the bottom of the same, together with and commingled with a downpour of water from the curtain of water above mentioned, which likewise has sufficient velocity as to be projected against the side walls of the vessel. And, it is now to be noted that the force of impact of the pitch particles, while yet in only a partially cooled state, against the side wall or walls of the vessel will compress, compact, and render more dense these small particles, and that adhesion thereof to the side walls of the vessel will be prevented by the downpour of water. If the projection of the pitch through the water curtain be not sufficient to entirely condense the vapor arising from the pitch, there are means within said vessel whereby such vapors may be exhausted from the vessel, condensed, and recovered if found desirable.

It is here to be mentioned that in the description of our apparatus, and in the drawings hereto annexed, we disclose the vessel as being horizontally disposed, with the pitch and water adapted to be introduced into the vessel about the vertical axis thereof. But in some instances we may dispose the vessel vertically, and introduce the pitch and the cooling medium about its horizontal axis. Such modification would require only the services of a skilled mechanic, and is well within the scope of our invention. And, while we refer to water as the cooling medium, we may substitute air at proper temperature, under sufficient pressure, volume, and velocity; or other suitable cooling media.

In the drawings already referred to and made a part hereof, Figure 1 is a central, vertical section of our apparatus, a portion thereof being broken away to bring the figure within the limits of the sheet. Fig. 2 is a like section of the remaining portion of Fig. 1. Fig. 3 is a plan of our apparatus, portions thereof being broken away to bring the figure within the confines of the sheet. Fig. 4 is a plan of a water-sluice-way or box located within the vessel. Fig. 5 is a longitudinal, vertical section in line 5—5 of Fig.

4. Fig. 6 is a vertical, transverse section of a detail on line 6—6 of Fig. 1. Fig. 7 is a horizontal section in line 7—7 of Fig. 6. Fig. 8 is an elevation of a modified form of centrifugal disk for centrifugalizing the molten pitch.

Like parts are indicated by corresponding characters or symbols of reference in all the figures of the drawings.

Referring again to the drawings, A is the containing vessel of our apparatus; comprising a circumscribing, cylindrical side wall B; a declined, conical bottom C; and a closed cover D; all of which members are water and air tightly joined together. This vessel is supported on legs E, over a concrete pit F, of suitable depth and dimensions, in which pit are located certain operating elements of our apparatus.

The apex of the conical bottom C is cut away, leaving an axial opening 10, surrounding which opening is fixed a water-tightly calked, flanged ring 11. To the under face of this ring is bolted or otherwise secured a hollow, cylindrical, hopper shaped casting 12, which casting is provided with a side outlet 13, to which is connected, by a suction pipe 14, a centrifugal or similar pump 15.

Extending axially through and formed integrally with the hopper shaped casting 12, there is a hollow standpipe 16, having a bottom 17, and a side outlet 18, to the latter of which is adapted to be connected a suitable vacuum pump or suction fan (not shown) for the exhaustion of vapors from within the vessel A. The upper end of the standpipe 16 projects within the conical bottom C of the vessel, and has at said upper end an extension 16ᵃ reaching up into the interior of the vessel a proper and prescribed distance, and axially of said vessel. The upper end of this extension is capped by a conical hood 19, axially of which is arranged a spring maintained anti-friction bearing 20, which is adapted for the reception of a vertical, axial shaft 21. The upper end of this shaft projects above the conical hood 19, and the lower end thereof extends through and beyond the bottom 17 of the standpipe 16. And, freely embracing this shaft 21, with its upper and lower ends water-tightly joined to the hood 19 and the bottom 17, respectively, is a pipe 22. It is now added that the upper end of the standpipe extension 16ᵃ is provided with a series of openings 23, wherethrough vapors may be exhausted from the interior of the vessel A.

Affixed to the bottom 17 of the standpipe 16 there is a U-shaped bracket 24, possessed of an antifriction bearing 25, and likewise of a foot or step bearing 26, both for the accommodation of the lower end of the shaft 21; and, near the lower end of this shaft is located a pulley 27, which pulley is connected by a belt 28 to a driving pulley 29 on a suitably driven and located countershaft 30.

Mounted on the upper end of the shaft 21 is a dished disk 31, the latter of which has an upwardly extending, axial, conical protuberance 32, and it may now be mentioned that this disk is to be rotated at a very high speed by the shaft 21 and its driving means; and, in order to avert any tendency to intense vibration of the disk and the shaft, due to a lack of running balance, the spring maintained antifriction bearing 20 is provided, whereby obvious results are obtained.

Projecting downwardly from the exterior of the vessel A, as hereinafter more fully explained, axially with the disk 31, and connected to a suitable source of molten pitch supply, there is a pitch pipe 33, the lower end of which reaches to within a short distance of the apex of the conical protuberance 32 on the disk 31. Molten pitch is caused to flow from this pipe into the dished disk 31, and, assuming that the said disk is rotating at the proper speed, the pitch will be forced up the inclined wall of the disk by centrifugal force, which pitch assumes a parabolic path in its outward travel owing to the dished form of the disk. It is here stated that the velocity of this disk at its periphery is sufficient to project the pitch against the side wall B of the vessel A. It is to be understood that the existing tension in the pitch, due to its high velocity, will cause the same to break or separate into small particles in its outward travel, which particles are cooled, compacted, and rendered more dense by the force of impact against the vessel wall and water curtain.

Located directly above the disk 31, and in axial line therewith, is disposed a water impeller G, a water distributing box H, and a water sluice-box I, the latter of which is water-tightly affixed to the under face of the cover D of the vessel A, and reference is now made to Figs. 4, 5, and 6, wherein the elements G, H, and I are disclosed on an enlarged scale and in greater detail.

The sluice-way or box I extends from a proper distance beyond the axis of the vessel A to the opposite wall thereof, as clearly seen in Fig. 3, and comprises a rectangular box having a bottom 34, side walls 35 and 35ᵃ, and an end wall 36. The top of this box is open and is water-tightly fastened by suitable angle irons and rivets or like media to the under side of the cover D of the vessel A, as well disclosed in Fig. 5. The end wall 37 of the box, i. e., opposite the end 36, is in the form of a spiral 37ᵃ of three quarters turn, beginning tangentially of the wall 35 and terminating normally to and at the wall 35ᵃ. In the bottom 34, with its center in alinement with the wall 35ᵃ and its inner periphery in close adjacency to the junction 38 of the spiral wall 37 with the wall 35ᵃ, is produced a circular opening 39, and, upon the under face of the bottom 34, is located a taper hopper 40, of the water distributer H, which coincides in size and register with the said opening 39. Axially of this hopper, a proper distance from the lower edge thereof, arises a cylindrical pipe 41, flanged at its upper end and water-tightly fastened to the under face of the cover D.

Between the pipe 41 and the inner wall of the taper hopper 40 are arranged a plurality of taper, radial, helical vanes 42, the object of which will now be explained, but it is first to be mentioned that the sluice-box I is provided with a suitable inlet pipe 43, connected to a proper source of water supply. As water in sufficient volume is conveyed into the sluice-box I, through the inlet 43, the water in striking the spiral wall 37, will have its flow converted into a motion similar to that of a whirlpool, and, as the same finds egress through the opening 39, meeting the helical vanes 42, the water will be divided into a plurality of streams, to each of which will be imparted a helical or whirling motion, due to the arrangement of the vanes 42. It is now to be remarked that the axes of the pipe 41, the hopper 40, and the opening 39 in the bottom 34 are coincident to each other and are likewise coincident to the axis of the vessel A.

There is formed in the cover D an opening 44, registering with the opening through the pipe 41, and there provided for the admittance of a driving shaft 45, Fig. 6, for the water impeller or centrifugalizer G, already mentioned. This impeller or centrifugalizer includes the shaft 45, which is hollow throughout its entire length and which extends upwardly through the pipe 41, through an antifriction journal box 46, located on the upper face of the cover D, and through a combined antifriction and thrust bearing 47 and 47ᵃ, supported upon the upper ends of upstanding channel irons 48, arising from the cover D and substantially fastened together. Near the upper end of the shaft 45 is fixed a thrust collar 49, bearing upon the thrust bearing 47ᵃ, to maintain the said shaft in placed position. Projecting upwardly and above said shaft 45, and fixed to the thrust bearing aforesaid is an inverted U-shaped strap 50, which embraces the upper end of the pitch pipe 33, (which passes through the hollow shaft 45) to prevent the said pipe rotating with the shaft 45. Located upon the shaft 45 is a driving pulley 51, connected by a belt 52 to a motor or other prime mover 53, whereby high rotative speed may be imparted to the impeller shaft 45. The bearing 46 is yieldably maintained in position by four helical springs 54, arranged preferably at right angles to each other, so that if said shaft be not in true running balance, the said bearing may adjust itself in an evident manner.

The lower end of the shaft 45 terminates a short distance above the pitch impelling disk 31 in an annular flange 55, to which is affixed a slightly upwardly dished disk 56 of relatively large diameter. Upon the upper face of this disk are arranged a plurality of upstanding radial vanes 57 the outer edges 58 of which stop short a slight distance from the periphery 59 of the disk 56. The upper edges of these vanes are inclined upwardly to the periphery of the shaft 45 and the lower portions of these edges are covered by an annular cover ring 60; the upper edge of this cover ring having a guard flange 61, the taper of which corresponds to the taper of the hopper 40 of the water distributing box I. The upper portions 62 of the vanes 57 are bent to an angle corresponding to the angularity of the vanes 42 in the hopper 40 of the distributer I, so that no impedance is created to the flow of water from the distributer to the impeller. It will now be noted that the guard flange 61 projects upwardly beyond the lower edge of the taper hopper 40 and that the adjacent edges of the vanes 42 and 57 are in relatively close proximity so that there is no tendency to leakage of water between the distributer H and the impeller G.

It being assumed that the impeller is in a state of very rapid rotation and that water is being delivered to the sluice box in sufficient volume (in a regulation apparatus approximately 2000 gallons per minute), the impeller will project the water by centrifugal force in a relatively thick sheet or curtain in an approximately horizontal plane to the surrounding side wall of the vessel A, and, after striking the said wall will flow downwardly along the wall to the hopper bottom C. It being likewise assumed that the pitch impeller 31 is in operation, it will be seen that the pitch will first be projected through the curtain of water in its upward parabolic path and again on its downward travel as already described, and that finally a thorough intermingling and commingling of water and pitch particles will take place, resulting in the cooling and hardening of the pitch particles in an effective manner.

The commingled pitch and water is removed from the vessel A through the opening 13 by the action of the pump 15 and delivered to a suitable separator (not shown) wherein the water and pitch granules are separated. In some instances it may be found desirable to project the pitch in a horizontal plane instead of in a parabolic path. In such instances, we substitute the pitch impelling disk 31ᵃ, Fig. 8, instead of the disk 31. The upper surface 31ᵇ of the disk 31ᵃ is, as will be noted, a plane surface.

The cover D of the vessel A is composed of a plurality of parallel sheets of sheet iron or steel $d$, $d^1$, $d^2$, the edges of which are water tightly joined together, and the cover as a whole is prevented from sagging by a plurality of properly disposed channel irons 100 or the like extending across the vessel and supported by the circumscribing wall B thereof.

Attention is now directed to the fact that the size of the pitch particles produced by our apparatus may be regulated at will. Reducing the rotative speed of the pitch impelling disk will reduce the tension of the projected pitch, and the result will be particles of larger size, whereas increasing the speed of the impeller will cause the pitch to be broken up or divided into smaller particles. Regulation of the volume of water projected will assist in producing similar results.

While herein we have entitled our invention as a process and apparatus for the preparation of hard commercial pitch in the form of small particles, we do not by any means confine ourselves to the preparation of pitch alone. There is a large and constantly increasing market for various metals prepared in the form of small particles. Aluminum in small particles is an active seller, and the market for the spelters in like form has long been known. Likewise the preparation of ferric metals in a finely divided state is gradually becoming an important factor in the trade. Our invention is capable of the production of these materials in this desired condition without practical change or modification, and we here desire it understood that the application of our invention to such purposes as above enumerated is nothing more nor less than double use, and well within the scope and spirit of our claims.

We have hereinbefore disclosed the preferred mode of practising our invention, but we reserve the right to make such and any changes as might occur to one skilled in the art to which this invention appertains, or to make any and all such alterations as may be permitted under the doctrine of equivalents.

What we claim is:—

1. The process of preparing pitch and the like in the form of small particles which consists in independently introducing molten pitch and a cooling agent into a vessel, subjecting said pitch and cooling agent to centrifugal action of different intensity, and causing the commingling of said pitch with said cooling agent.

2. The process of preparing pitch and the like in the form of small particles which consists in independently introducing molten pitch and a cooling agent into a vessel, subjecting said pitch and said cooling agent to centrifugal action of different intensity, causing the passage of said pitch through said cooling agent, and finally commingling said pitch with said cooling agent.

3. The process of preparing pitch and the like in the form of small particles which consists in independently introducing molten pitch and a cooling agent into a vessel, subjecting said pitch to centrifugal action, and said cooling agent to like centrifugal action, but of different intensity, causing the projection of said agent through a curved path, causing the passage of said pitch through said cooling agent, and finally commingling said pitch with said cooling agent, and then removing said commingled pitch particles and cooling agent from said vessel.

4. The process of preparing pitch and the like in the form of small particles which consists in introducing molten pitch and water into a vessel and subjecting the same to centrifugal action; in projecting said pitch through an upwardly curved path; in causing its passage through said centrifugalized water, and finally in commingling said pitch and water.

5. The process of preparing pitch and the like in the form of small particles which consists in independently introducing molten pitch and water into a vessel and subjecting the same to independent centrifugal action; in projecting said pitch through an upwardly curved path; in causing its passage through said centrifugalized water, and finally in commingling said pitch and water.

6. An apparatus of the general class described including a closed vessel having an outlet, alined shafts extending from the exterior of said vessel at opposite ends to therewithin, the facing ends of said shafts being in relative adjacency, a disk on the end of one of said shafts and a centrifugalizing impeller at the end of the other of said shafts, means for conveying molten pitch to said disk, other means conveying a cooling medium to said impeller, and devices for rotating said shafts, at different speeds, whereby the intensity of the centrifugal actions may be varied relative to each other.

7. An apparatus of the general class described including a closed vessel having an outlet, alined shafts extending from the exterior of said vessel at opposite ends to there within, the facing ends of said shafts being in relative adjacency, a dished disk on the end of one of said shafts, and a centrifugalizing impeller at the end of the other of said shafts, means for conveying molten pitch to said disk, other means conveying a cooling medium to said impeller, and devices for rotating said shafts, at different speeds, whereby the intensity of the centrifugal actions may be varied relative to each other.

8. An apparatus of the general class described including a closed vessel having an outlet and an exhauster in connection therewith, said exhauster being constructed to remove vapors from said vessel, shafts extending from the exterior of said vessel at opposite ends to there within and alined to each other, centrifugalizing devices at the ends of said shafts within said vessel, means conveying fluids to be centrifugalized to said devices, and other devices for rotating said shafts.

9. An apparatus of the general class described including a closed vessel having an outlet and an exhauster in connection therewith, shafts extending from the exterior of said vessel at opposite ends to there within and alined to each other, centrifugalizing devices at the ends of said shafts within said vessel, means conveying fluids to be centrifugalized to said devices, and other devices for rotating said shafts, a vapor stand pipe within said vessel, there being an outlet therefrom adapted for connection with exhausting media for removing vapors from within said vessel.

10. The process of preparing pitch, which consists in introducing molten pitch and a cooling agent into a vessel, in subjecting said pitch to centrifugal action, in subjecting said cooling agent to centrifugal action of differing intensity, and in projecting said cooling agent in a path through the path of said pitch.

11. The process of preparing pitch, which consists in introducing molten pitch and a cooling agent into a vessel, in subjecting said pitch to centrifugal action, in subjecting said cooling agent to centrifugal action of different intensity, and in projecting said cooling agent in a curved path through the path of said pitch.

12. The process of preparing pitch, which consists in introducing molten pitch and a cooling agent into a vessel, in subjecting said substances to centrifugal action of differing intensity, and in projecting one of said substances in a path through the path of the other of said substances.

13. In a device of the general character described, in combination, a closed vessel, shafts extending through the ends of said vessel into said vessel, centrifugalizing means on said shafts within said vessel, a fluid sluice box in connection with one of said centrifugalizers, fluid supply means to the other of said centrifugalizers, means in connection with said sluice box constructed to impart a helical whirl to said fluid, and means for rotating said shafts.

14. In a device of the general character described, in combination, a closed vessel, shafts extending through the ends of said vessel into said vessel, centrifugalizing means on said shafts within said vessel, a fluid sluice box in connection with one of said centrifugalizers, fluid supply means to the other of said centrifugalizers, means in connection with said sluice box constructed to impart a helical whirl to said fluid, a fluid distributing device in connection with said sluice box, means in said distributer to maintain said helical whirl, said distributer distributing fluid to said centrifugalizer, and means for rotating said shafts.

15. In a device of the general character described, in combination, a closed vessel, shafts extending through the ends of said vessel into said vessel, centrifugalizing means on said shafts within said vessel, a fluid sluice box in connection with one of said centrifugalizers, fluid supply means to the other of said centrifugalizers, means in connection with said sluice box constructed to impart a helical whirl to said fluid, a fluid distributing device in connection with said sluice box, means in said distributer to maintain said helical whirl, said distributer distributing fluid to said centrifugalizer, said centrifugalizer being hollow, there being means in said centrifugalizer to likewise maintain said helical whirl, and means for rotating said shafts.

16. In a device of the general class described, a closed vessel, shafts extending through the ends of said vessel to within said vessel, centrifugalizing means on said shafts, means for conveying fluid matter to said centrifugalizers, means in connection with one of said centrifugalizers constructed to project one of said fluids in a path passing through the path of the other of said fluids, and means for rotating said shafts.

17. In a device of the general class described, a vessel, shafts within said vessel, centrifugalizers on said shafts, devices for conveying fluid matter to said centrifugalizers, means in connection with one of said centrifugalizers constructed to project one of said fluids in a path passing through the path of the other of said fluids, and means for rotating said shafts.

18. In a device of the general class described, a vessel, a pair of shafts disposed axially of said vessel, said shafts being in alinement with each other, centrifugalizers on said shafts, means for conveying fluids to said centrifugalizers, devices in connection with one of said centrifugalizers constructed to project one of said fluids in a path passing through the path of the other of said fluids, and means for rotating said shafts.

19. In a device of the general class described, a vessel, a pair of shafts disposed axially of said vessel, said shafts being in alinement with each other, centrifugalizers at the adjacent ends of said shafts, said shafts being located adjacent to each other, means constructed to convey fluids to said centrifugalizers, devices in connection with one of said centrifugalizers constructed to project one of said fluids through the path of the other of said centrifugalizers, and means for rotating said shafts.

20. The process of preparing pitch, which consists in introducing molten pitch and a cooling agent into a vessel, in subjecting said substances to centrifugal action, and in projecting one of said substances in an upwardly directed path through the path of the other of said substances.

In testimony that we claim the foregoing as our invention, we have hereunto set our hands.

RAY P. PERRY.
EDWIN F. STEWART.